(12) United States Patent
Miyamoto et al.

(10) Patent No.: US 6,528,209 B2
(45) Date of Patent: Mar. 4, 2003

(54) ACTIVE MATERIAL FOR POSITIVE ELECTRODE FOR ALKALINE SECONDARY CELL AND METHOD FOR PRODUCING THE SAME, AND ALKALINE SECONDARY CELL USING THE ACTIVE MATERIAL FOR POSITIVE ELECTRODE AND METHOD FOR PRODUCING THE SAME

(75) Inventors: Kunihiko Miyamoto, Tokyo (JP); Naomi Bando, Tokyo (JP)

(73) Assignee: Toshiba Battery Co., Ltd., Tokyo (JP)

( * ) Notice: Subject to any disclaimer, the term of this patent is extended or adjusted under 35 U.S.C. 154(b) by 27 days.

(21) Appl. No.: 09/749,789

(22) Filed: Dec. 28, 2000

(65) Prior Publication Data

US 2001/0024744 A1 Sep. 27, 2001

(30) Foreign Application Priority Data

Dec. 28, 1999 (JP) .............................. 11-375705
Jan. 17, 2000 (JP) ........................ 2000-008086

(51) Int. Cl.$^7$ ................................ H01M 4/32
(52) U.S. Cl. .................... 429/223; 429/206; 429/218.2; 429/163; 423/594
(58) Field of Search ................ 429/223, 206, 429/218.2, 163; 423/594

(56) References Cited

FOREIGN PATENT DOCUMENTS

| DE | 44 29 273 A1 * | 2/1995 |
|----|----|----|
| EP | 0 789 408 | 8/1997 |
| EP | 0 851 516 | 7/1998 |
| EP | 0 852 405 | 7/1998 |
| EP | 0 902 490 | 3/1999 |
| EP | 0 942 481 | 9/1999 |
| JP | 8-148145 | 6/1996 |
| JP | 9-73900 * | 3/1997 |
| JP | 9-213326 | 8/1997 |
| JP | 11-260360 | 9/1999 |

* cited by examiner

Primary Examiner—Laura Weiner
(74) Attorney, Agent, or Firm—Oblon, Spivak, McClelland, Maier & Neustadt, P.C.

(57) ABSTRACT

Provided is a active material for positive electrode for an alkaline secondary cell, which advantageously exhibits improved overdischarge characteristics, improved utilization of the active material and an improved effect of suppressing the rise in cell internal pressure, a method for producing the same, and an alkaline secondary cell using the above active material for positive electrode, especially a nickel-hydrogen secondary cell.

The above active material comprises nickel hydroxide particles each having a surface to which a cobalt oxide sticks, wherein the cobalt oxide contains 20 to 40% by mole of cobalt(II) oxide, wherein the nickel hydroxide particles form an eutectic together with Co and Zn or/and Y, and the Co content of the eutectic is 2% by mass or less, and the nickel hydroxide particles have a value of a half width of the peak ascribed to the (101) crystal face diffraction of $0.8°/2\theta$(Cu—$K_\alpha$) or more as measured by powder X-ray diffractometry.

18 Claims, 2 Drawing Sheets

ACTIVE MATERIAL FOR POSITIVE ELECTRODE FOR ALKALINE SECONDARY CELL AND METHOD FOR PRODUCING THE SAME, AND ALKALINE SECONDARY CELL USING THE ACTIVE MATERIAL FOR POSITIVE ELECTRODE AND METHOD FOR PRODUCING THE SAME

BACKGROUND OF THE INVENTION

1. Field of the Invention

The present invention relates to a active material for positive electrode for an alkaline secondary cell and a method for producing the same as well as an alkaline secondary cell using the above active material for positive electrode, especially a nickel-hydrogen secondary cell and a method for producing the same. More particularly, the present invention is concerned with to a active material for positive electrode exhibiting high utilization and a method for producing the same, and an alkaline secondary cell, especially a nickel-hydrogen secondary cell, which is advantageous not only in that the rise in cell internal pressure is suppressed and both the charge-discharge cycle characteristics and the overdischarge characteristics are improved, but also in that it has excellent storage properties.

2. Prior Art

As representative examples of alkaline secondary cells, there can be mentioned a nickel-hydrogen secondary cell and a nickel-cadmium secondary cell. These cells have incorporated thereinto, as a positive electrode, a nickel electrode comprised mainly of nickel hydroxide which is a active material for positive electrode.

As the nickel electrode, one which is of sinter-type and one which is of paste-type have conventionally been used.

Of these, the sinter-type positive electrode is generally produced as follows. For example, there can be mentioned a method in which nickel particles are sintered in a two-dimensional substrate comprised of a perforated steel or a nickel net to prepare a porous substrate, and the pores in the sinter of the above nickel particles in the prepared porous substrate is impregnated with an aqueous solution of a nickel salt, and further, the aqueous solution of a nickel salt is converted into nickel hydroxide which is a active material for positive electrode using an alkaline aqueous solution.

However, in the above production method, cumbersome treatments are needed, such as an impregnation of an aqueous solution of a nickel salt, a treatment using an alkaline aqueous solution and the like. Further, for forming a active material for positive electrode (nickel hydroxide) in the predetermined amount, it is required to repeat the above-mentioned treatments 4 to 10 times, so that a problem arises in that the production cost for a positive electrode is increased.

In addition, when the porosity of the sinter of nickel particles which are sintered in the above porous substrate exceeds 80%, it is difficult to secure the mechanical strength of the sinter. Therefore, the porosity of the sinter cannot be increased to 80% or more, resulting in a restriction on the method for increasing the capacity of the positive electrode by increasing the amount of the active material added.

For solving the above problems, studies have been made on the paste-type positive electrode produced by a method in which nickel hydroxide particles, particles of a conductor and a binder are kneaded together with water, to thereby prepare a paste for an active material, and a conductive core material (current collector) having a three-dimensional network structure, such as a spongy porous metal or a metal mat fiber, is filled with the above prepared paste, and then, dried and subjected to calendering treatment successively, and the paste-type positive electrode is being put into practical use.

This paste-type positive electrode has a porosity and an average pore size of the conductive core material larger than those in the above-mentioned sinter-type positive electrode. Therefore, the filling of the core material with the active material paste, i.e., active material, is easy, and further, the amount of the active material added can be increased. Thus, from the viewpoint of increasing the capacity of a cell, the paste-type positive electrode is advantageous, as compared to the sinter-type positive electrode.

However, on the other hand, the paste-type positive electrode has the following problem. Specifically, since the pore size of the conductive core material is large, the distance between the active material in the pores of the core material and the skeleton of the core material (current collector passage) is large. In addition, the active material per se is non-conductive. Therefore, the conductivity of the positive electrode itself becomes poor, and the active material at a position far from the skeleton of the core material does not relate to the cell reaction, so that a problem is encountered that the utilization of the active material is lowered.

For solving the above problem, with respect to the paste-type positive electrode, a number of studies have been made to increase the utilization of the active material by satisfactorily securing the electrical connection state between the active materials or the active materials and the conductive core material.

The most common method for solving the problem is a method in which, during the preparation of the positive electrode paste, particles of metallic Co or a cobalt (Co) compound, such as a Co hydroxide or a Co oxide, is added and mixed in the predetermined amount as a conductive auxiliary.

When a positive electrode having a core material filled with the above-mentioned positive electrode pate is incorporated into an alkaline secondary cell, any metallic Co or any Co compound contained in the positive electrode pate is dissolved in the alkaline electrolytic liquid as complex ions once, and the ions are distributed on the surfaces of the nickel hydroxide particles. Then, when the cell is subjected to initial charging, these complex ions are oxidized prior to nickel hydroxide and converted into cobalt oxyhydroxide which is conductive. The resultant cobalt oxyhydroxide is deposited between the nickel hydroxide particles which are an active material or between the active material layer and the skeleton of the conductive core material, to thereby form a conductive matrix in the positive electrode. As a result, both the conductivity between the nickel hydroxide particles as an active material and the conductivity between the active material and the conductive core material are improved, so that the utilization of the active material in the positive electrode is improved.

In such a case, the above-mentioned metallic Co and Co compound are unstable in air, and it is difficult to uniformly mix these particles with the nickel hydroxide particles. Therefore, for increasing the utilization of nickel hydroxide while securing the conductivity as a positive electrode, it is necessary that the amount of the Co compound added be about 10% by mass.

However, when the amount of the Co compound added is large, the relative content of the nickel hydroxide particles (active material) in the active material paste prepared is reduced. In addition, from the viewpoint of the cell design, there is a need to form a discharge reserve for the counter electrode (negative electrode), and this prevents the capacity of the positive electrode from being increased.

The positive electrode is generally accommodated in a cell casing together with a negative electrode, a separator and an alkaline electrolytic liquid.

Then, the assembled cell is subjected to aging treatment and initial charging treatment so as to subject the active material for positive electrode incorporated to activation treatment.

In this case, since the Co compound coexisting with the active material (nickel hydroxide particles) in the positive electrode is electrochemically reversible, the Co compound is discharged during standing of the cell for a long term or due to a microleak current by an electronic switch when the cell is mounted into an appliance, and loses the conductivity thereof. For this reason, although varies depending on the environmental conditions, the cell capacity is sometimes lowered by about 10 to 20% of the rated capacity.

In addition to the above-mentioned method for solving the problem, there is also a method in which, prior to the preparation of an active material paste, the surface of the active material (nickel hydroxide particles) to be used is preliminarily coated with a Co oxide to impart a surface conductivity to the active material, and an active material paste is prepared using the resultant active material.

For example, Japanese Unexamined Patent Publication No. Hei 8-148145 discloses a method in which a bivalent Co compound is disposed on the surface of nickel hydroxide particles, and subjected to heat treatment in the presence of an alkaline aqueous solution and oxygen (air). By this method, the crystalline structure of the Co compound becomes irregular, and the above Co compound is converted into an oxide of Co having a valence of more than 2, specifically, an oxide of Co having a valence of 2.9, to thereby produce an active material comprising composite nickel hydroxide particles in which the nickel hydroxide particles are coated with a matrix of the converted Co oxide. Further, this prior art document discloses the characteristics of a cell having incorporated thereinto a nickel electrode using the active material comprising the above composite nickel hydroxide particles.

The cell having incorporated thereinto a positive electrode using an active material containing an oxide of Co having a valence of about 2.9, that is, Co which is almost completely oxidized, is improved in the capacity recovery ratio after short-circuiting standing (capacity recovery ratio after overdischarging); however, the utilization of the active material is lower than that of the conventional active material containing an oxide of Co having a valence of about 2. In addition, there is a problem in that the cell internal pressure rises during the charging.

This phenomenon is caused by the fact that, when Co is oxidized to an extent such that the valence thereof becomes about 2.9, the resultant Co oxide is extremely stable in the alkaline electrolytic liquid in the cell and is not dissolved in the alkaline electrolytic liquid, and thus, reformation of the above-mentioned conductive matrix bonding together the composite nickel hydroxide particles hardly occurs. Further, it is considered that the above phenomenon is caused by the fact that a small amount of Co transferred to the surface of the negative electrode is remarkably reduced, and hence, the gas absorbing power at the negative electrode becomes poor.

In addition, Japanese Unexamined Patent Publication No. Hei 9-213326 discloses a method in which nickel hydroxide particles are subjected to alkali heat treatment by adding to the nickel hydroxide particles an alkaline aqueous solution, such as an aqueous sodium hydroxide solution, and an aqueous solution of a Co compound, such as cobalt sulfate, simultaneously while heating the nickel hydroxide particles in the presence of oxygen, and thoroughly stirring and mixing the resultant mixture, to thereby coat the surface of the nickel hydroxide particles with a higher oxide of Co containing an alkali component.

However, in this method, actually, before the Co compound added is converted into a higher oxide to coat the surface of the nickel hydroxide particles, an oxidation of the Co compound proceeds and the Co compound is often converted into an oxide having a poor conductivity, so that a satisfactory amount of a conductive matrix is not formed between the nickel hydroxide particles.

Further, Japanese Unexamined Patent Publication No. Hei 9-73900 discloses the following method.

In this method, first, nickel hydroxide particles each having a surface on which cobalt hydroxide is deposited are produced separately. Then, the nickel hydroxide particles are subjected to alkali heat treatment by spraying an alkaline aqueous solution against the nickel hydroxide particles in a fluidization drying apparatus in an open system while flowing hot air through the apparatus, and fluidizing and mixing the entire content of the apparatus, to thereby convert cobalt hydroxide on the surface into a higher oxide of Co.

This method has an advantage in that an occurrence of agglomeration of the particles during the oxidizing treatment for the Co compound can be suppressed; however, this method is one in which a fluidization oxidization is conducted by supplying and evacuating heated air, and thus, it is difficult to obtain a good balance of the heat transmission between the components constituting the reaction system, resulting in a problem that it is extremely difficult to appropriately control the degree of oxidation of the Co compound.

Specifically, the fluidization mixing of the nickel hydroxide particles having the Co compound with the alkaline aqueous solution is conducted in a hot air convection mode using heated air. Therefore, when the concentration of the alkaline aqueous solution is increased to 35% by mass or higher or the amount of the alkaline aqueous solution sprayed per unit time is increased for keeping constant the oxidation reaction time, the fluidization of the nickel hydroxide particles does not occur, so that the fluidization mixing of the nickel hydroxide particles with the alkaline aqueous solution does not proceed.

Further, since air is used as a heat transmission medium, the deviation of heat distribution in the reaction system is large, so that the oxidation reaction of the Co compound ununiformly proceeds.

Actually, in the nickel-hydrogen secondary cell assembled from the positive electrode using the nickel hydroxide particles produced by this method, the utilization of the active material is not so high, and further, the cell internal pressure rises. In addition, the capacity recovery ratio after the cell is stored in a high temperature environment or stored at low temperatures for a long term is lowered, and hence, the storage properties are not excellent.

OBJECTS AND SUMMARY OF THE INVENTION

It is an object of the present invention to provide a active material for positive electrode for an alkaline secondary cell, which is advantageous in that it exhibits high utilization and is useful as an active material for a paste-type positive electrode, and a method for producing the same.

It is another object of the present invention to provide an alkaline secondary cell, especially a nickel-hydrogen secondary cell, which is advantageous not only in that the rise in cell internal pressure is suppressed and the capacity recovery ratio is excellent, but also in that it has excellent overdischarge characteristics and excellent storage properties as well as excellent charge-discharge cycle characteristics, and a method for producing the same.

For attaining the above objects, in the present invention, there is provided:

a active material for positive electrode for an alkaline secondary cell, comprising nickel hydroxide particles each having a surface to which a cobalt oxide sticks, wherein a part of the cobalt oxide comprises an oxide of cobalt(II).

Specifically, there is provided the active material for positive electrode wherein the oxide of cobalt(II) is present in an amount of 20 to 40% by mole, based on the total mole of the cobalt oxide.

Further, in the present invention, there is provided a method for producing a active material for positive electrode for an alkaline secondary cell, the method comprising:

mixing and stirring nickel hydroxide particles each having a surface to which a cobalt(II) compound sticks or/and mixture particles of nickel hydroxide particles and particles of metallic cobalt or a cobalt(II) compound with an alkaline aqueous solution in the presence of oxygen; and subjecting the resultant mixed and stirred system to heat treatment by radiation while mixing and stirring.

Still further, in the present invention, there is provided:

an alkaline secondary cell having incorporated thereinto a positive electrode having the above-mentioned active material for positive electrode, and specifically, there is provided a nickel-hydrogen secondary cell, comprising:

a cell casing;

an alkaline electrolytic liquid; and an electrode group comprising a positive electrode which comprises a conductive core material having carried thereon an active material comprised mainly of nickel hydroxide particles each having a surface coated with a sodium-containing cobalt oxide, or an active material comprised mainly of a mixture of nickel hydroxide particles each having a surface coated with a sodium-containing cobalt oxide and metallic cobalt or a cobalt(II) compound, a negative electrode which comprises a conductive core material having carried thereon a negative electrode preparation comprised mainly of a metal alloy having hydrogen occluded therein, and a separator disposed between the positive electrode and the negative electrode, wherein the electrode group is sealed in the cell casing together with the alkaline electrolytic liquid, wherein the alkaline electrolytic liquid contains 0.3 to 1.2 mole of lithium hydroxide, and there is provided a method for producing the above-mentioned nickel-hydrogen secondary cell, wherein an alkaline electrolytic liquid is poured into a cell casing and the cell casing is sealed up, and then, the resultant casing is allowed to stand in an environment at a temperature of 40 to 100° C. for 1 day or more.

DETAILED DESCRIPTION OF THE INVENTION

Figure 1:
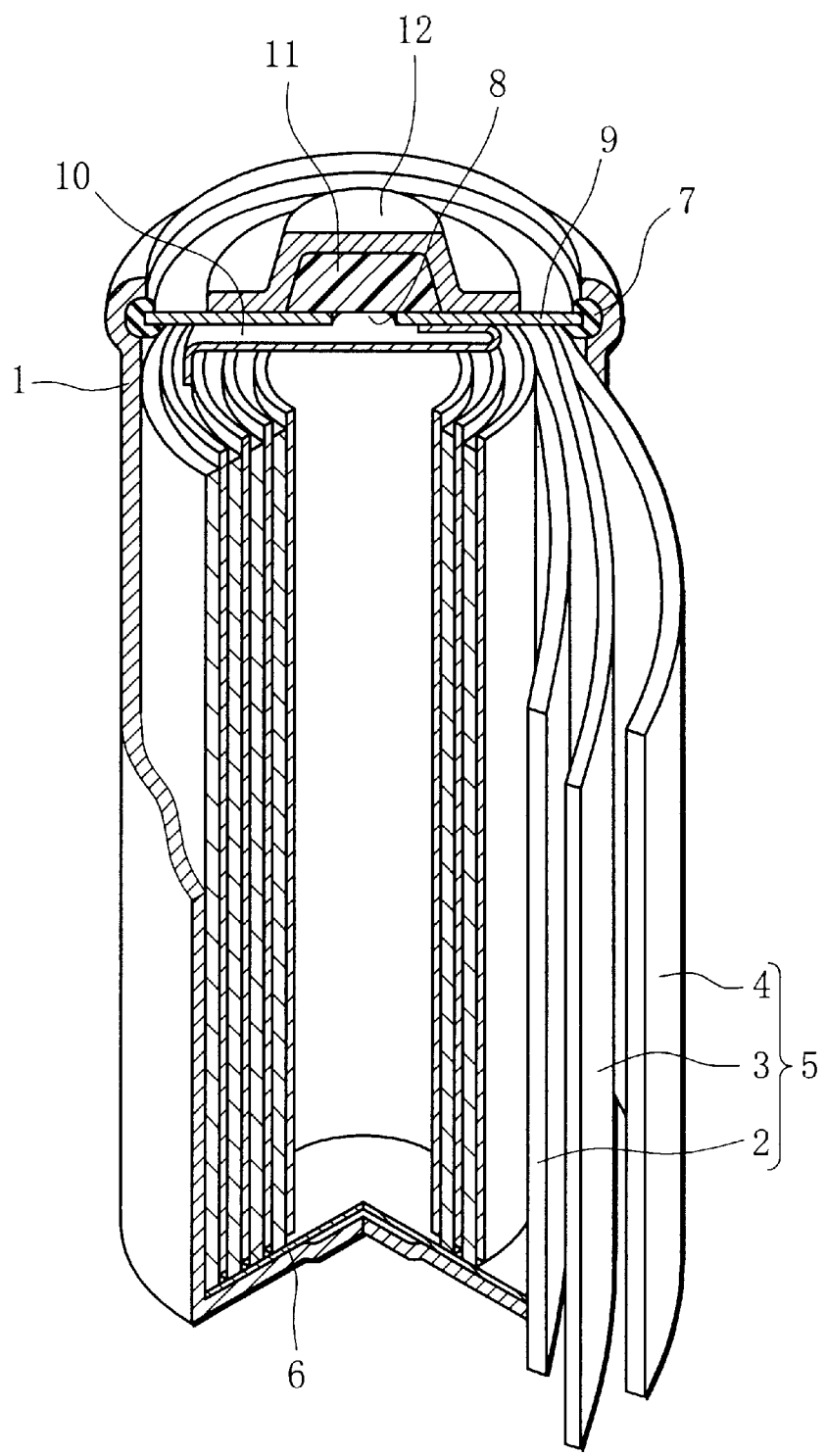
FIG. 1 is a partial cutaway cross-sectional view of a nickel-hydrogen secondary cell.

First, the active material is described.

The active material of the present invention comprises nickel hydroxide particles each having a surface to which a cobalt (Co) oxide sticks. The term "stick" used here means a state of entirely or partially coating and adhering to the surface of the nickel hydroxide particles.

In addition, the active material of the present invention has a characteristic feature such that a part of the above Co oxide is an oxide of bivalent Co [Co(II) oxide]. Specifically, it is preferred that the content of Co(II) oxide in the Co oxide is 20 to 40% by mole (mol %).

Unlike the oxide of Co having a valence of about 3 which is difficult to be dissolved in the alkaline electrolytic liquid in the cell, this Co(II) oxide is easily dissolved in the alkaline electrolytic liquid. Therefore, in the case of the active material of the present invention, the Co(II) oxide is dissolved in the alkaline electrolytic liquid in the cell as complex ions and distributed to and reprecipitated on various positions of the positive electrode preparation, and oxidized during the initial charging, so that a conductive matrix comprising cobalt oxyhydroxide or the like is formed between the nickel hydroxide particles. Thus, the Co(II) oxide improves the utilization of the active material.

In addition, a part of the Co(II) oxide dissolved in the alkaline electrolytic liquid as complex ions is diffused toward the negative electrode, and transferred to the surface of the negative electrode in a small amount. As a result, the gas absorbing power of the negative electrode is improved.

When the content of Co(II) oxide in the Co oxide sticking to the active material (nickel hydroxide particles) is less than 20 mol %, that is, the content of the oxide of Co having a valence as high as about 3 is more than 80mol%, there occur a rise in cell internal pressure as well as a lowering of the utilization of the active material in the assembled cell, causing the charge-discharge cycle characteristics to be lowered. On the other hand, when the Co(II) oxide content is more than 40 mol %, the capacity recovery ratio after overdischarging is lowered. For this reason, it is preferred that the content of Co(II) oxide in the Co oxide sticking to the surface of the nickel hydroxide particles is adjusted to 20 to 40 mol %.

The content (represented by "mol %") of Co(II) oxide used in the present invention means a value obtained by quantitative determination by the following oxidation-reduction titration method.

First, from the weight of the nickel hydroxide particles to which a Co oxide sticks, the weight of the nickel hydroxide particles used for producing the above particles is subtracted, to thereby determine the weight of the sticking Co oxide, and a mole of all Co is calculated.

The Co oxide sticking to the nickel hydroxide particles is dissolved in an aqueous solution of ammonium iron(II) sulfate, and the resultant solution is subjected to titration using an aqueous solution of potassium permanganate. (The titer in this titration is taken as B value.)

On the other hand, separately, as a blank titration, the above aqueous ammonium iron(II) sulfate solution is preliminarily subjected to titration using the above aqueous potassium permanganate solution. (The titer in this titration is taken as A value.)

A difference between A value and B value corresponds to the amount that Co(III) oxide among the Co oxide sticking to the nickel hydroxide particles changes Fe(II) in the aqueous ammonium iron(II) sulfate solution into Fe(III), and therefore, from this value (difference between A value and B value), the mole of Co(III) oxide is calculated.

Further, when all of the Co oxide sticking to the nickel hydroxide particles is taken as 100%, the value obtained by subtracting the percentage (%) of the mole of Co(III) oxide from 100% is a value of mol % of Co(III) oxide.

Thus, the Co(II) oxide in the present invention is not necessarily an oxide of Co having a valence of precisely 2, and includes an oxide of Co having a low valence, for example, 1.9 or 2.1, and an oxide of Co having a high valence, for example, 2.6 or 2.7. That is, the Co(II) oxide is an oxide of Co having a valence lower than 3.

The content of the above Co(II) oxide can be adjusted by controlling the oxidation of the Co compound used during the below-mentioned production of the active material so as to keep 20 to 40 mol % of the Co oxide formed in a state of bivalent oxide. Hereinafter, the thus produced active material is referred to as "active material I".

Further, in the below-mentioned production of the active material, the content of the above Co(II) oxide can also be adjusted by keeping almost all the Co compound used in a state of higher oxide having a valence of about 3, and mixing into this Co compound the predetermined amount of a Co(II) compound so that the concentration of bivalent Co collectively becomes 20 to 40 mol %. Hereinafter, the thus produced active material is referred to as "active material II".

By the way, with respect to the utilization of nickel hydroxide, proton-diffusion in the crystal is frequently a rate-determining factor. Nickel hydroxide having large proton-diffusion in the crystal thereof generally exhibits a high utilization.

The promotion of proton-diffusion can be realized by straining the crystal of nickel hydroxide. For example, nickel hydroxide in a strained crystal state such that the value of a half width of the peak ascribed to the (101) crystal face diffraction is broad as measured by powder X-ray diffractometry exhibits large proton-diffusion.

Specifically, preferred are the nickel hydroxide particles in a strained crystal state such that the value of a half width of the peak ascribed to the (101) crystal face diffraction is $0.8°/2\theta(Cu—K_\alpha)$ or more as measured by powder X-ray diffractometry because the utilization as an active material is improved.

The nickel hydroxide particles used in the present invention may be pure nickel hydroxide, but it is preferred that the nickel hydroxide particles form an eutectic together with Co and zinc (Zn) or/and yttrium (Y), and the content of Co in the eutectic of the nickel hydroxide is 2% by mass or less.

Each of Zn and Y suppresses the lowering of the oxygen generation potential of nickel hydroxide in a high temperature environment. Further, Co works to lower the charge potential of nickel hydroxide. Therefore, when nickel hydroxide which forms an eutectic together with these components is used as an active material, the oxygen overvoltage of the positive electrode increases, thus making it possible to enhance the charge efficiency.

In addition, by using nickel hydroxide which forms an eutectic together with the above components, the swelling of the positive electrode caused by the charging-discharging operation can be suppressed. Therefore, the charge-discharge cycle characteristics of the cell can be improved. The formation of an eutectic with Y is effective for suppressing the lowering of the oxygen generation potential in a high temperature environment, and the formation of an eutectic with Zn is effective for obtaining an effect of suppressing the swelling of the positive electrode.

Generally, when an eutectic of nickel hydroxide and other elements is formed, the strain of the resultant crystal becomes large. However, when an eutectic of nickel hydroxide and Zn is formed, the strain of the resultant crystal generally becomes small and the crystallinity is enhanced, so that the utilization of the active material tends to lower.

Therefore, in the above preferred nickel hydroxide particles, an appropriate strain of the crystal can be secured by the formation of an eutectic with Co, and this makes up for the tendency of lowering of the utilization caused by the formation of an eutectic with Zn, and as a result, both an improvement of the utilization and an improvement of the charge-discharge cycle characteristics can be achieved.

Preferred strain of the crystal is one in the above-mentioned state wherein the value of a half width of the peak ascribed to the (101) crystal face diffraction is $0.8°/2\theta(Cu—K_\alpha)$ or more.

When the content of Co in the eutectic of the nickel hydroxide particles is more than 2% by mass, during the below-mentioned heat oxidization, in the presence of an alkaline aqueous solution, of particles of a Co compound to be added to the above nickel hydroxide particles or particles obtained by preliminarily coating the above nickel hydroxide particles with the particles of a Co compound, Co in the eutectic is reacted with an alkali to extremely increase the crystallinity, causing the utilization to be lowered. For example, in the nickel hydroxide particles in which the content of Co in the eutectic is more than 2% by mass, the value of a half width of the peak ascribed to the (101) crystal face diffraction after the heat oxidization treatment is lowered to $0.6°/2\theta(Cu—K_\alpha)$, causing the utilization to be lowered. For this reason, it is preferred that the content of Co in the eutectic is restricted to 2% by mass or less.

Next, an explanation is made on the method for producing the active material of the present invention.

As a starting material in the production of the active material of the present invention, for example, use is made of nickel hydroxide particles each having a surface to which a Co compound, such as cobalt hydroxide, sticks, which are obtained by a method in which nickel hydroxide particles are added to an alkaline aqueous solution of which the pH is controlled in a range of from 11 to 13, and an aqueous solution of cobalt sulfate is slowly added thereto. In addition, mixture particles comprising the nickel hydroxide particles having added thereto particles of metallic Co or a Co compound, such as $Co(OH)_2$, $CoO_3$, $Co_3O_4$, CoO or a mixture of these, preferably $Co(OH)_2$ or CoO, may be used.

In such a case, it is preferred that the content of metallic Co or the Co compound in the above particles is 1.0% by mass or more, in terms of the mass of Co. When the content is less than 1.0% by mass, the conductivity of the positive electrode having carried thereon the obtained active material is not satisfactorily secured, so that an improvement of the utilization of the active material cannot be expected.

Then, the above starting material is charged into a stirring container, and an alkaline aqueous solution is sprayed or added dropwise to the system while thoroughly mixing and stirring in the presence of oxygen, specifically, in air, so that the starting material and the alkaline aqueous solution are uniformly mixed with each other. In this instance, the mixed and stirred system is heated in the presence of oxygen simultaneously.

In this case, as the alkaline aqueous solution, an aqueous solution of sodium hydroxide, an aqueous solution of potassium hydroxide, or a mixture of these solutions and an aqueous solution of lithium hydroxide is used.

In this process, a part of the Co compound is dissolved in the hot alkaline aqueous solution as complex ions, and the resultant ions wet the surface of the nickel hydroxide particles and coats the surface of the nickel hydroxide particles.

In addition, the coating Co complex ions are redeposited and oxidized by coexisting oxygen and heat as water in the alkaline aqueous solution evaporates. The resultant conductive Co oxide comprised of a Co higher oxide coats the surface of the nickel hydroxide particles, to thereby form a highly conductive matrix.

It is preferred that the concentration of the alkaline aqueous solution used is adjusted to 1 to 14 M. When the concentration is less than 1 M, the solubility of the Co compound becomes poor, so that the formation of the matrix of the highly conductive Co oxide is unsatisfactory. On the other hand, when the concentration is more than 14 M, the viscosity of the alkaline aqueous solution is too high and the penetration property of the alkaline aqueous solution between the nickel hydroxide particles becomes poor, so that the Co compound added is not satisfactorily dissolved in the alkaline aqueous solution.

Further, with respect to the method of heating, there is no particular limitation, and, for example, there can be mentioned a method of heating the mixed and stirred system from the outside, a method of heating the mixed and stirred system by, for example, directly blowing hot air, and a method of heating the mixed and stirred system by subjecting the system to radiation of a microwave from a magnetron, or radiation, such as infrared radiation, far infrared radiation or the like. Among these methods, from the viewpoint of improving the utilization of the active material, the method of heating by radiation of a microwave is advantageous.

Specifically, the microwave requires no heat transmission medium, and vibrates water molecules coexisting in the mixed and stirred system to uniformly heat the nickel hydroxide particles. Therefore, a precursor (Co complex ions) of a conductive matrix formed on the surface of the nickel hydroxide particles is oxidized in a state such that it is also uniformly heated, so that a Co oxide which constitutes a conductive layer is uniformly formed on the surface of the nickel hydroxide particles. In addition, it is considered that the microwave radiation has a function of increasing the surface activity of the nickel hydroxide particles by causing the crystal structure of the nickel hydroxide particles to suffer a defect by the energy dosed or causing the state of the pores to be changed. The heat treatment by such a microwave radiation may be conducted for the mixed and stirred system for about 20 minutes.

In addition, the method of heating by radiation of a microwave from a magnetron is most preferred because the energy efficiency is high and the reaction system can be heated to the predetermined temperature in a short time, and the high speed response properties are excellent and further, the entire reaction system can be uniformly heated. The reaction system may be subjected to heat treatment by combining the method of heating by microwave radiation with the method of heating by convection or heat transfer.

Further, it is preferred that the temperature of the heat treatment for the mixed and stirred system is 40 to 150° C. When the temperature is lower than 40° C., the dissolution amount of the Co compound contained in this system in the alkaline aqueous solution is lowered and the evaporation rate of the alkaline aqueous solution is lowered, and thus, the formation of the highly conductive Co oxide is difficult, so that the utilization of the active material is not so high. On the other hand, when the temperature is higher than 150° C., water in the alkaline aqueous solution is disadvantageously evaporated before the alkaline aqueous solution reaches the mixed system of the nickel hydroxide particles and the Co compound, and thus, the solubility of the Co compound is extremely lowered and, like the above case, the formation of a matrix of the highly conductive Co oxide is difficult, so that the utilization of the active material is not so high. In addition, the oxidation of the Co compound is likely to proceed and the ratio of Co(III) oxide in the Co oxide is likely to be 100%, so that the utilization of the active material is not increased.

Thus, active material I of the present invention is produced.

In the above-mentioned production of the active material, by appropriately selecting the conditions for the heat treatment, the content of Co(II) oxide in the Co oxide formed can be adjusted to 20 to 40 mol %.

For example, when the method of heating by microwave radiation is performed, the degree of oxidation of the Co complex ions can be adjusted by appropriately selecting the output of the magnetron, the heat treatment temperature, the heat treatment time, the concentration of the alkaline aqueous solution used and the like.

Specifically, the content of Co(II) oxide can be adjusted to 20 to 40 mol % by using, as the alkaline aqueous solution, one having a concentration of 1 to 14 N, adjusting the output of the magnetron to 0.05 to 0.5 kW per 1 kg of the starting materials, adjusting the heat treatment temperature to 60 to 130° C., and stirring and mixing for about 1 to 30 minutes.

The production of active material II can be conducted as follows.

First, in accordance with the method for producing active material I, nickel hydroxide particles each having a surface to which a Co oxide sticks are produced. In this instance, all of the Co compound added may be converted into an oxide of trivalent Co, and a part of the Co compound may remain as Co(II) oxide.

Then, the nickel hydroxide particles and the particles of Co(II) oxide are mixed together in the predetermined amounts. Therefore, when all of the sticking Co oxide are trivalent, the valence of the Co oxide is diluted with Co(II) oxide, so that the valence of the Co oxide after mixing is collectively less than 3. In this case, the content (mol %) of oxide of bivalent Co in the obtained mixture can be 20 to 40 mol % by adjusting the amount of Co(II) oxide to be mixed.

Next, the alkaline secondary cell of the present invention is described taking as an example a cylindrical nickel-hydrogen secondary cell.

In FIG. 1, in cell casing 1 in a closed-end cylindrical form, electrode group 5 comprising a spirally wound sheet obtained by laminating together the below-mentioned nickel electrode (positive electrode) 2, the below-mentioned separator 3 and metal alloy having hydrogen occluded therein (hydrogen occlusion metal alloy) electrode (negative electrode) 4 is accommodated. In addition, negative electrode 4 is disposed on the outermost layer of electrode group 5, so that it is electrically contacted with cell casing 1, and the bottom portion of electrode group 5 is disposed on insulating plate 6 disposed on the bottom portion of cell casing 1.

Insulating gasket 7 in a ring form is disposed on the inside of the upper opening portion of cell casing 1, and sealing plate 9 in a disc form, having pore 8 at a center portion thereof, is disposed in a state such that the periphery thereof intermeshes with insulating gasket 7, and sealing plate 9 airtightly seals up the upper opening portion of cell casing 1 through insulating gasket 7 by a caulking processing in which the upper opening portion of cell casing 1 is inwardly caulked.

In addition, lead terminal 10 is provided on the upper portion of electrode group 5 and welded to the lower surface of sealing plate 9. Then, safety valve 11 made of a rubber is disposed so as to close center pore 8 of sealing plate 9, and further, positive electrode terminal 12 in a hat shape is welded to sealing plate 9 so as to cover the safety valve, so that the electrode group is sealed in.

Positive electrode 2 of electrode group 5 is produced as follows. First, the above-mentioned active material of the present invention, a binder, such as carboxymethyl cellulose, methyl cellulose, sodium polyacrylate, polytetrafluoroethylene or hydroxypropylmethyl cellulose, are kneaded together with water, to thereby prepare a viscous paste. It is preferred that the amount of the binder added is adjusted to 0.1 to 2.0% by mass, based on the mass of the active material.

Then, the pates is applied onto, for example, a conductive core material having a three-dimensional structure, such as a spongy nickel substrate, a network sinter metal fiber substrate, or a felt electroplated substrate obtained by electroplating a nonwoven fabric with nickel, and then, the paste is dried, and if desired, subjected to pressure molding, to thereby form a positive electrode sheet having the predetermined thickness. In this instance, as the conductive core material, a two-dimensional substrate, such as a punched metal or an expanded metal, or a two and half-dimensional substrate having a structure such that the opening portion of a punched metal has a fin can also be used.

Next, negative electrode 4 is produced by a method in which a hydrogen occlusion metal alloy, a binder and a conductor are kneaded in the predetermined amounts, together with water, to thereby prepare a paste, and the paste is applied onto the above-mentioned conductive core material, and then, dried and shaped.

With respect to the hydrogen occlusion metal alloy used, there is no particular limitation as long as it can electrochemically occlude therein and release therefrom hydrogen, and, for example, there can be mentioned $LaNi_5$, $MmNi_5$ (Mm means a Mischmetal), $LmNi_5$ (Lm means a lanthanum-enriched Mischmetal), a multi-element metal obtained by substituting a part of Ni with Al, Mn, Co, Ti, Cu, Zn, Zr, Cr, B or the like, TiN, TiFe, MgNi or a mixed system of these materials. Particularly, the hydrogen occlusion metal alloy represented by the following formula: $LmNi_wAl_xMn_y$ (w, x and y represents atomic ratios satisfying the relationship: $5.00 \leq w+x+y \leq 5.5$) is preferred from the viewpoint of suppressing pulverization during the charge-discharge cycle to improve the cell in cycle life properties.

In addition, as the binder, the above-mentioned various polymer materials used in the production of positive electrode 2 can be used, and it is preferred that the amount of the binder added is adjusted to 0.1 to 5% by mass, based on the mass of the hydrogen occlusion metal alloy.

As the conductor, for example, there can be mentioned carbon black, a graphite powder and the like, and it is preferred that the amount of the conductor added is adjusted to 0.1 to 4.0% by mass, based on the mass of the hydrogen occlusion metal alloy.

In addition, as separator 3, there can be mentioned a nonwoven fabric of polyolefin fiber, such as polypropylene fiber, polyethylene fiber or the like, a nonwoven fabric of nylon fiber, and a mixed fabric of these fibers. Further, there can be mentioned one which is subjected to hydrophilicity treatment if desired. Particularly, preferred is a nonwoven fabric of polyolefin fiber having a fiber surface which is subjected to hydrophilicity treatment.

As the alkaline electrolytic liquid accommodated in the cell, for example, a mixed aqueous solution of sodium hydroxide and lithium hydroxide, a mixed aqueous solution of potassium hydroxide and lithium hydroxide, a mixed aqueous solution of sodium hydroxide, potassium hydroxide and lithium hydroxide, or the like can be used.

In the above nickel-hydrogen secondary cell, by using the below-mentioned active material for positive electrode and the alkaline electrolytic liquid containing lithium hydroxide, not only be the rise in cell internal pressure suppressed, but also an initial charging at a high rate can be achieved.

In such a cell, first, as a active material for positive electrode, there are used nickel hydroxide particles each having a surface coated with a sodium (Na)-containing Co oxide wherein a part of the Co oxide comprises an oxide of Co(II).

Specifically, active material I is one which is produced by using, as the alkaline aqueous solution, sodium hydroxide and subjecting the mixed and stirred system of the nickel hydroxide particles and metallic Co or a Co(II) compound to the above-mentioned alkali heat treatment in the presence of oxygen, wherein a part of the metallic Co or Co(II) compound is allowed to remain as an oxide of Co(II) by adjusting the heat treatment conditions.

In this process, the surface of the nickel hydroxide particles is coated with a Co oxide, and at the same time, the Na component of the sodium hydroxide used is drawn in the Co oxide, to thereby form a Na-containing Co oxide which is conductive.

In addition, active material II is one which is obtained by mixing together nickel hydroxide particles each having a surface to which a Na-containing Co oxide sticks by alkali heat treatment and particles of metallic Co or a Co(II) compound in the predetermined amounts.

In each of these active materials I and II, it is preferred that the amount of the Na-containing Co oxide is adjusted to 0.5 to 20% by mass in terms of the mass of Co, based on the total mass of the active material.

In the active material wherein the amount of the Na-containing Co oxide is less than 0.5% by mass in terms of the mass of Co, the amount of the conductive matrix formed in the positive electrode produced using such an active material is reduced, so that it is difficult to increase the utilization of the active material. On the other hand, the amount is more than 20% by mass in terms of the mass of Co, the relative weight ratio of the nickel hydroxide particles to each of active materials I and II is reduced, causing a lowering of the discharge capacity of the cell having incorporated thereinto the positive electrode produced using such an active material.

In addition, the Na component of the Na-containing Co oxide is a component which contributes to the improvement of the conductivity of the Na-containing Co oxide, and thus, it is preferred that the amount of the Na component is adjusted to 0.05 to 5% by mass, based on the total mass of each of the produced active materials I and II.

When the amount of the Na component is less than 0.05% by mass, the conductivity of the Na-containing Co oxide on the surface of the nickel hydroxide particles is unsatisfactory, so that it is difficult to obtain an effect of improving the utilization of the active material. On the other hand, when the amount of the Na component is more than 5% by mass, not only be the effect of improving the conductivity of the Na-containing Co oxide saturated, but also Na is dissolved out into the positive electrode preparation paste when the paste is produced by kneading together the active material and water, and inhibits the binding function of the binder in the paste, thus making it difficult to adjust the viscosity of the paste.

In the case of the positive electrode produced using active material II, at a time when the cell is assembled, metallic Co or a Co(II) compound is dissolved in the alkaline electrolytic liquid accommodated as complex ions and converted into a conductive matrix. Therefore, the conductivity is further improved and the effect of increasing the utilization of the active material is improved, as compared to those in the case of the positive electrode produced using active material I.

In addition, in the case of active material II, at the time of initially activating the cell assembled, a small amount of metallic Co or a Co(II) compound is converted into complex ions and they are diffused toward the negative electrode. Particularly, when the cell is allowed to stand in a high temperature environment, the above diffusion phenomenon remarkably occurs. Then, although the mechanism of a reaction has not yet been elucidated, the Co component diffused toward the negative electrode (hydrogen occlusion metal alloy electrode) suppressed dissolution of the dissolved component of the hydrogen occlusion metal alloy in the alkaline electrolytic liquid, and increases the reactivity and the gas absorbing rate of the negative electrode surface, and as a result of these, the utilization is improved and the rise in cell internal pressure is suppressed.

It should be noted that such effects can also be obtained by incorporating a negative electrode (hydrogen occlusion metal alloy electrode) produced by use of a negative electrode preparation to which an appropriate amount of a Co component or a Co(II) compound was formulated when it was prepared.

In this nickel-hydrogen secondary cell, it is preferred to use an alkaline electrolytic liquid which contains lithium hydroxide.

Specifically, for example, a mixed aqueous solution of sodium hydroxide and lithium hydroxide, a mixed aqueous solution of potassium hydroxide and lithium hydroxide, a mixed aqueous solution of sodium hydroxide, potassium hydroxide and lithium hydroxide, or the like can be used.

It is considered that lithium hydroxide has a function of adsorbing onto the electrode surface to suppress dissolution of the electrode components out of the electrode surface into the alkaline electrolytic liquid or weaken a reaction, such as reduction or the like. Further, the content of lithium hydroxide in the alkaline electrolytic liquid is adjusted to 0.3 to 1.2 M.

When the content of lithium hydroxide is less than 0.3 M, in the case where the cell is stored for a long term, the crystal of the Na-containing Co oxide in the active material suffers degradation or reduction, causing the utilization of the active material to be lowered. On the other hand, when the content of lithium hydroxide is more than 1.2 M, lithium hydroxide is drawn not only on the surface of the Na-containing Co oxide but also deeply in the crystal of the Na-containing Co oxide, and the Na-containing Co oxide suffers a change in structure during the charging and discharging of the cell, resulting in a damage of the conductive matrix.

In addition, with respect to the nickel-hydrogen secondary cell using such an active material and an alkaline electrolytic liquid containing lithium hydroxide, especially using active material II which is a mixture of nickel hydroxide particles coated with the Na-containing Co oxide and particles of metallic Co or a Co(II) compound, after assembling of a cell, the cell is allowed to stand in an environment at a temperature of 40 to 100° C. for 1 day or more.

By subjecting the cell to such a treatment, the dissolution of the Co(II) compound added to the active material into the alkaline electrolytic liquid is promoted, and in this standing process, the above-mentioned precursor of the conductive matrix is formed.

EXAMPLES

Examples 1 to 3 and Comparative Examples 1 and 2

(1) Preparation of Active Material

First, there were provided nickel hydroxide particles in which the zinc (Zn) content of the eutectic and the cobalt (Co) content of the eutectic were 5% by mass and 1% by mass, respectively, and the value of a half width of the peak ascribed to the (101) crystal face diffraction was $0.8°/2\theta$ ($Cu-K_\alpha$) as measured by powder X-ray diffractometry, and cobalt hydroxide particles in which the value of a half width of the peak ascribed to the (001) crystal face diffraction was $0.2°/2\theta(Cu-K_\alpha)$ as measured by powder X-ray diffractometry.

Subsequently, 5 parts by mass of the cobalt hydroxide particles was added to 100 parts by mass of the nickel hydroxide particles, and the resultant mixture was charged into a general mixer and mixed together at 25° C. for 2 minutes.

Then, with respect to the resultant mixed power, a valence analysis was conducted as follows.

1.0 g of the mixed power was taken as a sample, and the sample was dissolved in 25 ml of an aqueous ammonium iron(II) sulfate solution having a concentration of 0.05 N, and then, the resultant solution was subjected to titration using an aqueous potassium permanganate solution having a concentration of 1/40 N. The titer in this titration was taken as "B" ml.

On the other hand, as a blank test, the above aqueous ammonium iron(II) sulfate solution was subjected to titration using the above aqueous potassium permanganate solution. The titer in this titration was taken as "A" ml.

Then, the amount of a metal regarded as being trivalent contained in 1.0 g of the sample was quantitatively determined by back titration using the following formula:

$$(A-B) \times f \times 0.001473 \times 1.0 \ (g)$$

(wherein f represents a factor of the 1/40 N aqueous potassium permanganate solution).

As a result, it was found that the content of the metal regarded as being trivalent in the Co component of the cobalt hydroxide added was less than 0.1% by mass. From this result, it is confirmed that the content of the trivalent metal in the mixed powder is less than 0.1% by mass, and almost all the Co component of the cobalt hydroxide added is bivalent.

Next, the mixed powder was subjected to oxidizing treatment.

First, 3 kg of the mixed powder was taken as one batch, and the one batch was charged into a mixer (having a capacity of 10 L) having a microwave radiation function.

Then, an aqueous sodium hydroxide solution was sprayed into the mixer simultaneously with microwave radiation while thoroughly mixing. In this instance, the concentration and the amount sprayed of the aqueous sodium hydroxide solution, the output of the magnetron and the radiation time, the stirring time and the like were variously changed, to thereby form various types of active materials I.

Then, each of active materials I was washed with water until the pH of the washing water became 7 to 8, and the alkali component sticking to the surface was removed, and then, the resultant active material was subjected to dehydration and drying treatments.

Subsequently, with respect to each of active materials I obtained from the batches, a valence analysis was conducted in the same manner as mentioned above.

Then, assuming that all the oxidized component is bivalent Co, the amount of unoxidized bivalent Co corresponding to the titer "B" in the above valence analysis was quantitatively determined, and a ratio (represented by percentage) of the mole of the above determined value to the total mole of Co before oxidizing treatment was obtained by making calculation.

Then, from active materials I, six types of active materials shown in Table 1 were selected.

TABLE 1

| | Type of active material | Cobalt (II) oxide content (mol %) |
|---|---|---|
| Comparative Example 1 | a particles | 0 |
| Example 1 | b particles | 18 |
| Example 2 | c particles | 27 |
| Example 3 | d particles | 42 |
| Example 4 | e particles | 59 |
| Comparative Example 2 | f particles | 100 (No oxidizing treatment) |

(2) Assembling of Cell

Using the above active materials I, positive electrodes were produced as follows.

First, into 100 parts by mass of active material I were incorporated 0.2 part by mass of carboxymethyl cellulose, 1.0 part by mass of a polytetrafluoroethylene (PTFE) dispersion (specific gravity: 1.5; solids content: 60% by mass), and 30 parts by mass of water, and then, the resultant mixture was kneaded, to thereby prepare a positive electrode preparation paste.

A nickel porous sheet having a porosity of 95%, an average pore size of 200 μm and a thickness of 1.5 mm was filled with the above-prepared paste, and dried, followed by roll-calendering, to thereby produce six types of positive electrodes for a 4/3 A cell having a theoretical capacity of 3,800 mAh.

On the other hand, a negative electrode was produced as follows.

First, a commercially available Mischmetal (Mm), nickel (Ni), Co, manganese (Mn) and aluminum (Al) were mixed together so that the mass ratio became 4.0:0.4:0.3:0.3, and the resultant mixture was melted by means of a high-frequency melting furnace. Then, the resultant melted metal was cooled, to thereby prepare an ingot of a metal alloy having hydrogen occluded therein (hydrogen occlusion metal alloy) having a composition: $MmNi_{4.0}Co_{0.4}Mn_{0.3}Al_{0.3}$ (Mm: Mischmetal). The ingot was ground, and then, classified, to thereby obtain an alloy power having particles diameter of 50 μm or less.

Into 95 parts by mass of the alloy power were incorporated 1.0 part by mass of carboxymethyl cellulose, 3.0 parts by mass of a PTFE dispersion (specific gravity: 1.5; solids content: 60% by mass), 1.0 part by mass of carbon black, and 50.0 parts by mass of water, to thereby prepare a negative electrode preparation paste.

The prepared paste was applied onto a punched nickel sheet having an opening ratio of 45%, and dried, followed by roll-calendering, to thereby produce a hydrogen occlusion metal alloy electrode (negative electrode).

Then, using a hydrophilicity-treated polypropylene non-woven fabric as a separator and 3.8 ml of a mixed aqueous solution of sodium hydroxide, potassium hydroxide and lithium hydroxide as an alkaline electrolytic liquid, with respect to each of the types of the active materials, nine cylindrical nickel-hydrogen secondary cell groups in a size of 4/3 A at 3,800 mAh having a structure shown in FIG. 1 and were assembled.

1. Evaluation of Cell Characteristics (1) Utilization of Active Material

First, a cell group was subjected to aging at 25° C. for 19 hours. Then, with respect to the resultant cell group, a charging was conducted at a current of 0.1 CmA until the depth became 150%, and a discharging was conducted at a current of 0.2 CmA until the voltage became 1.0 V, and this charging-discharging operation was repeated 10 times, and the utilization of the active material after the 10th cycle in which the discharge capacity was satisfactorily stabilized was calculated. The results were shown in Table 2 as a maximal value, a minimal value and an average value.

TABLE 2

| Cell group | | | | |
|---|---|---|---|---|
| | | Utilization of active material (%) | | |
| Type of cell group | Type of active material used in positive electrode incorporated | Maximal value | Minimal value | Average value (n = 9) |
| Cell group A | a particles | 106 | 100 | 105 |
| Cell group B | b particles | 110 | 107 | 108 |
| Cell group C | c particles | 110 | 108 | 109 |
| Cell group D | d particles | 111 | 108 | 109 |
| Cell group E | e particles | 111 | 109 | 110 |
| Cell group F | f particles | 112 | 109 | 110 |

As is apparent from Tables 1 and 2, the utilization of the active material depends on the content of Co(II) oxide, and the cell group having a Co(II) oxide content of 20 mol % or more exhibits a high utilization.

(2) Evaluation of Overdischarge Characteristics

Three cells were arbitrarily taken from cell groups A to F, and with respect to each of the cells taken, a charging was conducted at a charge current of 1.0 CmA until −dV became 10 mV, and then, a discharging was conducted at a discharge current of 1.0 CmA until the voltage became 1.0 V, and this charging-discharging operation was repeated 3 times. The capacity after the 3rd cycle was taken as an initial capacity. Then, a 2Ω resistance was connected to the cell and the cell was subjected to short-circuiting for one month. Further, with respect to the resultant cell, a charging was conducted at a charge current of 1.0 CmA until −dV became 10 mV, and then, a discharging was conducted at a discharge current of 1.0 CmA until the voltage became 1.0 V, and this charging-discharging operation was repeated 3 times. The capacity after the 3rd cycle was taken as a capacity after overdischarging, and a ratio (%) of this capacity to the initial capacity was obtained by making calculation, and the obtained value was taken as a recovery ratio after overdischarging.

The results were shown in Table 3.

TABLE 3

| Cell group | | Recovery ratio after overdischarging |
|---|---|---|
| Type | Type of active material used | (%, average in n = 3) |
| Cell group A | a particles | 100 |
| Cell group B | b particles | 98 |
| Cell group C | c particles | 97 |
| Cell group D | d particles | 95 |
| Cell group E | e particles | 85 |
| Cell group F | f particles | 73 |

As is apparent from Tables 1 and 3, in cell groups E and F using the active material having too large a Co(II) oxide content (mol %), the recovery ratio after overdischarging is considerably lowered.

The reason for this resides in that Co(III) oxide which is electrochemically formed during the initial charging and discharging is unstable, and discharged by overdischarge due to short-circuiting and changed into a Co(II) compound. Thus, the Co(II) oxide content should be adjusted to 40 mol % or less.

(3) Evaluation of Internal Pressure Characteristics

Three cell were arbitrarily taken from cell groups A to F, and positive electrode terminal 12 and safety valve 11 made of a rubber shown in FIG. 1 were removed to open the upper portion of the cell.

Figure 2:
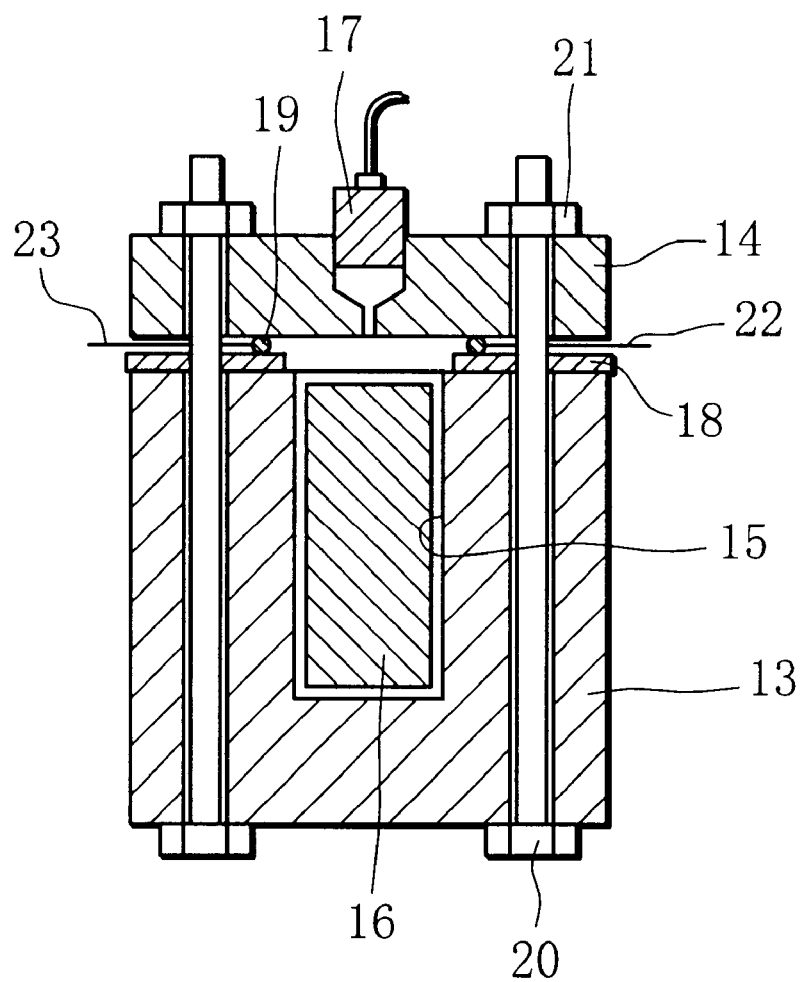
FIG. 2 is a cross-sectional view of a test apparatus for measuring a cell internal pressure.

Then, the test apparatus shown in FIG. 2 was assembled. Specifically, this test apparatus comprises casing body 13 and cap 14 which are made of an acrylic resin, and hollow 15 which can accommodate therein a cell casing for a cell in a 4/3 size is formed in the center portion of casing body 13, and the above-mentioned cell 16 is accommodated in hollow 15.

Cap 14 serves as a sealing plate, and further, can detect the internal pressure of cell 16 accommodated in hollow 15 by providing pressure detector 17 on cap 14.

Cap 14 is airtightly fixed on casing body 13 by bolt 20 and nut 21 through rubber sheet 18 and O-ring 19. Then, negative electrode lead 22 from the negative electrode and positive electrode lead 23 from the positive electrode are drawn out through the above-mentioned rubber sheet 18 and O-ring 19.

Using this apparatus, with respect to the cell accommodated, a charging was conducted at a charge current of 0.3 CmA until the depth became 450%, and then, the cell internal pressure was measured. The results are shown in Table 4.

TABLE 4

| Cell group | | Cell internal pressure (× 10$^5$ Pa, average in n = 3) |
|---|---|---|
| Type | Type of active material used | |
| Cell group A | a particles | 15 |
| Cell group B | b particles | 7 |
| Cell group C | c particles | 5 |
| Cell group D | d particles | 5 |
| Cell group E | e particles | 4 |
| Cell group F | f particles | 3 |

As is apparent from Tables 1 and 4, the cell internal pressure of cell A using the active material containing no Co(II) oxide is very high, and the larger the Co(II) oxide content (mol%), the lower the cell internal pressure.

The reason for this is presumed as follows. When the Co(II) oxide content is small, the absolute value of the amount of the Co(II) oxide dissolved in the alkaline electrolytic liquid is small, and thus, the formation of the matrix at the positive electrode becomes unsatisfactory and the movement of the Co component toward the negative electrode does not occur, causing the gas absorbing power to be lowered. Thus, the Co(II) oxide content should be adjusted to 20 mol % or more.

(4) Evaluation of Charge-Discharge Cycle Characteristics

Three cell were arbitrarily taken from cell groups A to F, and a charge-discharge cycle test was conducted as follows. A charging was conducted at a charge current of 1.0 CmA until −dV became 10 mV, and then, a discharging was conducted at a discharge current of 1.0 CmA until the voltage became 1.0 V, and this charging-discharging operation was repeated 500 times.

The average value (n=3) of the capacity of the cell group exhibiting the highest utilization of the active material after the 1st cycle was taken as 100% capacity, and the capacity values of other cell groups were represented by a value relative to the value of 100% capacity, and the results every 100 cycles were shown in Table 5.

In addition, with respect to each of the cell groups, a reduced weight of the cell between before and after the test of 500 cycles was measured, and the results were shown in Table 5 as an average value.

TABLE 5

| Cell group | | Charge-discharge cycle characteristics (%) | | | | | | |
|---|---|---|---|---|---|---|---|---|
| Type | Type of active material used | After 1st cycle | After 100th cycle | After 200th cycle | After 300th cycle | After 400th cycle | After 500th cycle | Reduced weight (g) |
| Cell group A | a particles | 95 | 85 | 70 | 60 | 55 | 50 | 0.14 |
| Cell group B | b particles | 98 | 96 | 92 | 87 | 80 | 75 | 0.06 |
| Cell group C | c particles | 98 | 97 | 94 | 88 | 82 | 79 | 0.05 |
| Cell group D | d particles | 98 | 97 | 94 | 89 | 82 | 80 | 0.05 |
| Cell group E | e particles | 99 | 97 | 95 | 90 | 83 | 85 | 0.05 |
| Cell group F | f particles | 100 | 98 | 96 | 93 | 85 | 82 | 0.04 |

As is apparent from Tables 1 and 5, the larger the content of the Co(II) oxide of the active material used in the cell group, the smaller the degree of the lowering of the capacity, or the higher the capacity, and the smaller the reduced weight of the cell. By contrast, in cell group A using the active material containing no Co(II) oxide, not only be the capacity markedly lowered, but also the reduced weight of the cell is large.

The reason for this is as follows. Like Examples 1 to 3, when the content of the Co(II) oxide sticking to the surface of the nickel hydroxide particles is small, the amount of the Co(II) oxide dissolved in the alkaline electrolytic liquid is markedly lowered. Therefore, a conductive matrix connecting the composite nickel hydroxide particles or the composite nickel hydroxide particles and the conductive core material, which are physically away from each other during the production of the cell, is not reformed after the production of the cell, so that a reaction cannot uniformly proceed, causing the utilization to be lowered. Further, this induces an increase in the amount of the gas generated in the cell and a lowering of the gas absorbing power of the negative electrode, causing a rise in internal pressure.

The results of the rise in internal pressure are apparent from also the reduced weight between before and after the charge-discharge cycle test shown in the Table. Gassing occurs due to the decomposition of the alkaline electrolytic liquid caused as a side reaction during the charging. In other words, the gassing caused by the rise in internal pressure indicates that the alkaline electrolytic liquid disappears from the cell, and the resistance in liquid is increased and the discharge operation voltage is lowered, resulting in a lowering of the capacity.

For obtaining excellent charge-discharge cycle characteristics, it is desired that the Co(II) oxide content is 20 mol % or more.

Examples 4 to 6 and Comparative Examples 3 and 4

Ni, Zn and Co were dissolved in an aqueous solution of sulfuric acid, and the resultant solution was adjusted at a temperature of about 40° C. and added dropwise to the convected aqueous sodium hydroxide solution. The resultant solution was adjusted at a pH of about 11 using an ammonium salt, to thereby prepare spherical nickel hydroxide particles. In this instance, the amounts of Ni, Zn and Co dissolved were variously changed, to thereby form five types of nickel hydroxide particles having different contents of Zn and Co in the eutectic shown in Table 6. Then, with respect to each of these nickel hydroxide particles, a value of a half width of the peak ascribed to the (101) crystal face diffraction was measured by powder X-ray diffractometry.

Then, active materials I were prepared using the above nickel hydroxide particles under the same conditions as those in Example 1. With respect to each of the prepared active materials, mol % of Co(II) oxide was measured, and, as a result, it was found that, in all of the active materials, the content was 20 mol %.

Then, the content (mol %) of Co(II) oxide in the prepared active material I was calculated by the same manner as that in Examples 1 to 3, and a value of a half width of the peak ascribed to the (101) crystal face diffraction was also measured by powder X-ray diffractometry.

Next, using these active materials, electrodes were produced under the same conditions as those in Examples 1 to 3, and further, using these electrodes, three nickel-hydrogen secondary cells per one electrode in a size of 4/3 A at 3,800 mAh were assembled in the same manner as in Examples 1 to 3.

Then, with respect to each of these cell groups, a utilization of the active material was calculated in the same manner as in Examples 1 to 3.

The results are summarized in Table 6.

TABLE 6

| | | Active material used | | | Value of half width of peak ascribed to (101) crystal face diffraction °/2θ(Cu-K$_a$) | | |
|---|---|---|---|---|---|---|---|
| | Type of cell group | Type | Zn content of eutectic (% by mass) | Co content of eutectic (% by mass) | Before oxidizing treatment | After oxidizing treatment | Utilization of active material (%) |
| Comparative Example 3 | Cell group G | g particles | 5 | 0.8 | 0.93 | 0.9 | 109 |
| Example 4 | Cell group H | h particles | 5 | 1.4 | 0.8 | 0.91 | 109 |
| Example 5 | Cell group I | i particles | 5 | 2 | 1.01 | 0.82 | 105 |
| Example 6 | Cell group J | j particles | 5 | 2.4 | 1.01 | 0.73 | 102 |
| Comparative Example 4 | Cell group K | k particles | 5 | 2.8 | 1.03 | 0.62 | 100 |

As is apparent from Table 6, when the nickel hydroxide particles having a Co content of the eutectic of 2% by mass or less are used, the utilization of the active material is increased.

In addition, when the Zn content of the eutectic is constant at 5% by mass and the Co content of the eutectic is increased, in the nickel hydroxide particles before the oxidizing treatment, the value of a half width of the peak ascribed to the (101) crystal face diffraction becomes large. However, in the nickel hydroxide particles after the oxidizing treatment, when the Co content of the eutectic is 2% by mass or more, the value of a half width of the peak ascribed to the (101) crystal face diffraction of the active material powder is remarkably lowered.

The reason for this resides in that not only the Co component of the nickel hydroxide particles added during the production of the active material but also the Co component preliminarily present in the eutectic of the nickel hydroxide particles increase the crystallinity of the active material produced in the course of the oxidizing treatment. Therefore, the proton-diffusion is suppressed, so that a lowering of the utilization of the active material is recognized.

Thus, it is preferred that the Co content of the eutectic of the nickel hydroxide particles is 2% by mass or less.

Examples 7 and 8

Spherical nickel hydroxide particles in which the Zn content of the eutectic and the Co content of the eutectic were 5% by mass and 1.4% by mass, respectively, and spherical nickel hydroxide particles in which the Zn content of the eutectic, the Co content of the eutectic and the Y content of the eutectic were 5% by mass, 1.4% by mass and 0.4% by mass, respectively, were produced in the same manner as in Examples 4 to 6. The former particles are referred to as "l particles", and the latter particles are referred to as "m particles".

These two types of nickel hydroxide particles were subjected to oxidizing treatment under the same conditions as those in Example 1, to thereby prepare active materials. The content of the Co(II) oxide in each of these active material was 20 mol %, and the value of a half width of the peak ascribed to the (101) crystal face diffraction of l particles was $0.91°/2\theta(Cu-K_\alpha)$, and that of m particles was $0.90°/2\theta(Cu-K_\alpha)$.

Using these active materials, two types of cell groups were produced in the same manner as in Example 1, and using these cell groups, three nickel-hydrogen secondary cells in a size of 4/3 A at 3,800 mAh per one electrode were assembled. The cell group assembled using l particles is referred to as "cell group L", and the cell group assembled using m particles is referred to as "cell group M".

These cell groups were subjected to aging at 25° C. for 19 hours, and with respect to each of the resultant cell groups, in an atmosphere at 25° C., a charging was conducted at a current of 0.1 CmA until the depth became 150%, and a discharging was conducted at a current of 1.0 CmA until the voltage became 1.0 V, and this charging-discharging operation was repeated, and the capacity after the 10th cycle in which the discharge capacity was stabilized was taken as a charge capacity in atmosphere at 25° C.

Then, in an atmosphere at 55° C., a charging was conducted at a current of 0.1 CmA until the depth became 150%, and the cell group was allowed to stand in an atmosphere at 25° C. for 5 hours, and it was confirmed that the cell temperature reached 25° C. Then, a discharging was conducted at a current of 1.0 CmA until the voltage became 1.0 V, and the capacity at that time was taken as a charge capacity in an atmosphere at 55° C. A ratio (%) of the latter charge capacity to the former charge capacity was calculated, and the calculated value was shown in Table 7 as a high-temperature charge efficiency.

TABLE 7

| | Type of cell group | High-temperature charge efficiency (%) |
|---|---|---|
| Example 7 | Cell group L | 70 |
| Example 8 | Cell group M | 90 |

As is apparent from Table 7, in cell group M produced using the active material in which nickel hydroxide forms an eutectic together with Y, the high-temperature charge efficiency is remarkably improved.

From the charge curve in an atmosphere at 55° C. with respect to each of cell groups L and M, a comparison was made on the oxygen overvoltage difference between cell groups L and M, and as a result, the oxygen overvoltage difference in cell group M is higher than that in cell group L by 13 mV. This is a result supporting the improvement of the charge efficiency at high temperatures due to the suppression of loss of the charge energy caused by the oxygen gas generation during the charging.

Thus, by using the nickel hydroxide particles in which nickel hydroxide forms an eutectic together with Y, the charge efficiency at high temperatures can be enhanced.

Examples 9 to 12 and Comparative Examples 5 and 7

1. Preparation of Active Material

Nickel hydroxide particles having an average particle diameter of 10 μm and a cobalt hydroxide powder having an average particle diameter of 1 μm were mixed in a weight ratio of 10:1, and the resultant mixed powder was charged into a fluidization granulation apparatus, and an aqueous solution of sodium hydroxide having a concentration of 8 N was sprayed thereto while stirring and was thoroughly mixed together, and simultaneously, the mixed and stirred system was subjected to heat treatment at about 100° C. for 20 minutes by microwave radiation by operating a magnetron at 1 kW.

The obtained powder was subjected to qualitative analysis by means of an electron scanning microscope (SEM)-energy dispersion spectrum (EDS), and as a result, it was confirmed that there was a film of the Na-containing Co oxide on the surface of the nickel hydroxide particles. In addition, with respect to the Na-containing Co oxide, a quantitative analysis was conducted by inducively coupled plasma (ICP) emission spectrometry, and as a result, it was found that the content of the Co component was 10% by mass, and the content of the Na component was 0.5% by mass.

This powder is taken as active material A.

Then, active material A and a cobalt monoxide powder having an average particle diameter of 1 μm were mixed in a weight ratio of 100:1, to thereby prepare an active material. This is taken as active material B.

2. Production of Positive Electrode

Into 100 parts by mass of the above-prepared active material were incorporated 0.25 part by mass of carboxymethyl cellulose, 0.25 part by mass of sodium polyacrylate, 3 parts by mass of polytetrafluoroethylene, and an appropriate amount of water, and then, the resultant mixture was thoroughly kneaded, to thereby prepare a paste.

Then, a nickel fiber substrate was filled with the above-prepared paste, and dried, followed by roll-calendering, to thereby produce a positive electrode.

The positive electrode prepared using active material A is taken as positive electrode A, and the positive electrode prepared using active material B is taken as positive electrode B.

For comparison, into 100 parts by mass of nickel hydroxide particles having an average particle diameter of 10 μm were incorporated 10 parts by mass of a cobalt monoxide powder having an average particle diameter of 1 μm, 0.25 part by mass of carboxymethyl cellulose, 0.25 part by mass of sodium polyacrylate, 3 parts by mass of polytetrafluoroethylene, and an appropriate amount of water, and then, the resultant mixture was thoroughly kneaded, to thereby prepare a paste, and a nickel fiber substrate was filled with the prepared paste, and dried, followed by roll-calendering, to thereby produce a positive electrode. This positive electrode is taken as positive electrode C.

3. Production of Negative Electrode

A hydrogen occlusion metal alloy having a composition formula: $LmNi_{4.0}Co_{0.4}Al_{0.3}$ (Lm means a lanthanum-enriched Mischmetal) was mechanically ground, and into 100 parts by mass of the resultant alloy powder were incorporated 0.5 part by mass of sodium polyacrylate, 0.125 part by mass of carboxymethyl cellulose, 1.5 part by mass (in terms of the solids content) of a polytetrafluoroethylene dispersion, 1 part by mass of carbon black, and 50 parts by mass of water, and then, the resultant mixture was thoroughly kneaded, to thereby prepare a paste, and the prepared paste was applied onto a punched nickel sheet, and dried, followed by roll-calendering, to thereby produce a negative electrode. This negative electrode is taken as negative electrode A.

In addition, a negative electrode was produced in substantially the same manner as in the case of negative electrode A except that 0.1 part by mass of the cobalt hydroxide power having an average particle diameter of 1 μm was further added. This negative electrode is taken as negative electrode B.

4. Production of Nickel-Hydrogen Secondary Cell

The positive electrode and the negative electrode were combined as indicated in Table 8, and a separator made of a polypropylene nonwoven fabric, which was subjected to hydrophilicity treatment, was disposed between the positive and negative electrodes, to thereby constitute an electrode group, and the electrode group was accommodated in a cell casing, and further, an alkaline electrolytic liquid having a composition indicated in Table 8 was poured thereinto, thereby assembling a cylindrical nickel-hydrogen secondary cell (4/5 A size) having a structure shown in FIG. 1.

The assembled cell was allowed to stand in an environment at a temperature of 60° C. for 1 day, and then, a 150% charging was conducted at 0.5 CmA, and a discharging was conducted at 0.5 CmA until the voltage became 1 V, to thereby effect activation.

5. Performance of Cell

With respect to each of the cells, a charging was conducted at 0.1 CmA, and a discharging was conducted at 0.2 CmA until the voltage became 1 V, and a discharge capacity was measured, and an initial utilization of the active material was determined from the theoretical capacity.

In addition, the cell in the discharge state was stored in an environment at a temperature of 65° C. for 1 month, and then, a 150% charging was conducted at 0.1 CmA in an environment at a temperature of 25° C. over 15 hours, and a discharging was conducted at 1.0 CmA until the voltage became 1 V. Then, a charging was conducted at 1.0 CmA for 1.5 hour, and a discharging was conducted at 1.0 CmA until the voltage became 1 V, and this charging-discharging operation was repeated 3 times. A discharge capacity after the 3rd cycle was measured and taken as a recovery capacity, and the recovery capacity was divided by the initial capacity to obtain a capacity recovery ratio (%).

The results are summarized in Table 8.

TABLE 8

| | Cell elements | | | Cell characteristics | |
| | | | | Utilization | Capacity |
| | Positive electrode used | Negative electrode used | Alkaline electrolytic liquid | of active material (%) | recovery ratio (%) |
|---|---|---|---|---|---|
| Example 9 | Positive electrode A | Negative electrode A | 7 M KOH + 1 M LiOH | 97 | 99 |
| Example 10 | Positive electrode B | Negative electrode A | 7 M KOH + 1 M LiOH | 102 | 98 |
| Example 11 | Positive electrode A | Negative electrode B | 7 M KOH + 1 M LiOH | 99 | 99 |
| Example 12 | Positive electrode B | Negative electrode B | 7 M KOH + 1 M LiOH | 100 | 99 |
| Comparative Example 5 | Positive electrode C | Negative electrode A | 7 M KOH + 1 M LiOH | 100 | 74 |
| Comparative Example 6 | Positive electrode C | Negative electrode A | 8 M KOH only | 99 | 72 |
| Comparative Example 7 | Positive electrode A | Negative electrode A | 8 M KOH only | 98 | 79 |

From Table 8, the followings are apparent.

(1) From a comparison made between Example 9 and Comparative Example 5, it is found that, although the same positive electrode and alkaline electrolytic liquid are used, the capacity recovery ratio of the cell in Example 9 is remarkably improved. This shows the effect obtained by the use of active material A in the production of a positive electrode.

(2) As apparent from a comparison between Example 9 and Comparative Example 7, it is found that, although the same positive and negative electrodes are used, the capacity recovery ratio of the cell in Example 9 is remarkably improved. This shows the effect obtained by adding LiOH to the alkaline electrolytic liquid accommodated.

(3) The difference between Example 9 and Examples 10 to 12 resides in that the active material for positive electrode in Example 9 has no post-addition of the Co component and the positive electrode or negative electrode in Examples 10 to 12 has a post-addition of the Co component.

In addition, the utilization of the active material in any of Examples 10 to 12 is high, as compared to that in Example 9. The reason for this is presumed to reside in that the Co component post-added suppresses dissolution of the dissolved component of the negative electrode, thus preventing the positive electrode from being adversely affected. Further, it is also considered that the utilization of the active material is improved by the fact that a conductive matrix is formed from the Co component post-added on the positive electrode later.

Examples 13 to 18

A cell in Example 10 was assembled using positive electrode B. Then, the cell was allowed to stand in an environment at a temperature shown in Table 9 for 1 day, and allowed to stand at 25° C. for 3 hours, and then, with respect to the resultant cell, a charging was conducted at 0.1 CmA until the depth became 150%, and a 1.0 V-cut discharging was conducted at 1.0 CmA, and this charging-discharging operation was repeated 10 times. The utilization of the active material after the 10th cycle and the cell internal pressure when a 150% charging was conducted at 0.3 CmA later were measured. The results were shown in Table 9.

TABLE 9

| | Temperature for standing (° C.) | Cell characteristics | |
|---|---|---|---|
| | | Utilization of active material (%) | Cell internal pressure (maximum: x10$^5$ Pa) |
| Example 13 | 25 | 100 | 7 |
| Example 14 | 40 | 101 | 6 |
| Example 15 | 60 | 102 | 4 |
| Example 16 | 80 | 101 | 4 |
| Example 17 | 100 | 100 | 3 |
| Example 18 | 120 | 96 | 3 |

As is apparent from Table 9, when the temperature for standing in the initial charging after assembling the cell is increased, the cell internal pressure during the charging is lowered. The reason for this is presumed to reside in that, although in a small amount, the Co component post-added is dissolved out and diffused toward the negative electrode, and enhances the reactivity of the negative electrode surface, to thereby increase the gas absorbing rate.

However, when the temperature for standing is higher than 100° C., a lowering of the utilization of the active material occurs. The reason for this is presumed that the Co compound and the nickel hydroxide particles are very strongly combined, so that the reversibility of nickel hydroxide becomes poor.

A cell in Example 10 was assembled by combining a negative electrode produced using an alkali-treated hydrogen occlusion metal alloy and positive electrode B, and allowed to stand similarly in the charged state in an environment at a temperature of 60° C. for 1 day, and the cell internal pressure was measured under the same conditions, and as a result, the maximal internal pressure was 3×10$^5$ Pa.

What is claimed is:

1. An active material for a positive electrode for an alkaline secondary cell comprising: nickel hydroxide particles each having a surface, and a cobalt oxide sticking to the surface of said particles, said cobalt oxide containing 20 to 40% by mole oxide of cobalt (II) together with an oxide of cobalt (III).

2. The active material for positive electrode according to claim 1, wherein said nickel hydroxide particles form an eutectic together with cobalt and zinc or/and yttrium, and the content of said cobalt in the eutectic is 2% by mass or less.

3. The active material for positive electrode according to claim 2, wherein said nickel hydroxide particles have a crystallinity wherein the value of a half width of the peak ascribed to the (101) crystal face diffraction is 0.8°/2θ(Cu—K$_α$) or more as measured by powder X-ray diffractometry.

4. An alkaline secondary cell comprising:
a cell casing;
an alkaline electrolytic liquid sealed in said casing; and an electrode group sealed in said casing, said electrode group including a positive electrode containing the active material according to any one of claims 1, 2 or 3, a negative electrode, and a separator disposed between the positive electrode and the negative electrode.

5. The alkaline secondary cell according to claim 4, wherein said negative electrode contains a hydrogen storing metal and thus said cell is a nickel-hydrogen secondary cell, wherein said alkaline electrolytic liquid contains 0.3 to 1.2 M lithium hydroxide, and wherein said cobalt oxide is a sodium-containing cobalt oxide.

6. The nickel-hydrogen secondary cell according to claim 5, wherein said sodium-containing cobalt oxide is present in an amount of 0.5 to 20% by mass in terms of the mass of cobalt, based on the total mass of the active material.

7. The nickel-hydrogen secondary cell according to claim 6, wherein said sodium is present in an amount of 0.05 to 5% by mass, based on the total mass of the active material.

8. The nickel-hydrogen secondary cell according to claim 7, wherein said negative electrode further includes any one of a metallic cobalt and a cobalt(II) compound.

9. The alkaline secondary cell according to claim 4, wherein said negative electrode contains a hydrogen storing metal and thus said cell is a nickel-hydrogen secondary cell, wherein said alkaline electrolytic liquid contains 0.3 to 1.2 M lithium hydroxide, wherein said cobalt oxide is a sodium-containing cobalt oxide, and wherein said positive electrode further includes any one of metallic cobalt particles and cobalt(II) compound particles.

10. The nickel-hydrogen secondary cell according to claim 9, wherein said sodium-containing cobalt oxide is present in an amount of 0.5 to 20% by mass in terms of the mass of cobalt, based on the total mass of the active material.

11. The nickel-hydrogen secondary cell according to claim 10, wherein said sodium is present in an amount of 0.05 to 5% by mass, based on the total mass of the active material.

12. The nickel-hydrogen secondary cell according to claim 11, wherein said negative electrode further including any one of a metallic cobalt and a cobalt and a cobalt(II) compound.

13. A method for producing a active material for positive electrode for an alkaline secondary cell, said method comprising:

mixing and stirring nickel hydroxide particles each having a surface to which a cobalt(II) compound sticks with an alkaline aqueous solution in the presence of oxygen; and subjecting the resultant mixed and stirred system to heat treatment by radiation while mixing and stirring.

14. The method according to claim 5, wherein said radiation is a microwave from a magnetron.

15. A method for producing a nickel-hydrogen secondary cell comprising the steps of:

providing a cell casing, sealing an alkaline electrolytic liquid and n electrode group in said cell casing, said alkaline electrolytic liquid containing 0.3 to 1.2 M lithium hydroxide, said electrode group including a positive electrode containing nickel hydroxide particles each having a surface and a sodium-containing cobalt oxide sticking to the surfaces of said particles, said sodium-containing cobalt oxide containing 20 to 40% by mole oxide of cobalt (II)together with an oxide of cobalt (III), a negative electrode containing a hydrogen storing metal, and a separator disposed between the positive electrode and the negative electrode.

16. A method for producing a nickel-hydrogen secondary cell, comprising steps of:

providing a cell casing, sealing an alkaline electrolytic liquid and an electrode group in said cell casing, said alkaline electrolytic liquid containing 0.3 to 1.2 M lithium hydroxide, said electrode group including a positive electrode containing nickel hydroxide particles each having a surface, a sodium-containing cobalt oxide sticking to the surfaces of said particles, said sodium-containing cobalt oxide containing 20 to 40% by mole oxide of cobalt (II) together with an oxide of cobalt (III), and any one of metallic cobalt particles and cobalt (II) compound particles, a negative electrode containing a hydrogen storing metal, and a separator disposed between the positive electrode and the negative electrode, and keeping said cell casing in an environment at a temperature of 40 to 100° C for 1 day or more.

17. A method for producing an active material for a positive electrode for an alkaline secondary cell, said method comprising:

mixing and stirring a mixture of particles comprising nickel hydroxide particles and any one of metallic cobalt particles and cobalt(II) compound particles with an alkaline aqueous solution in the presence of oxygen; and subjecting the resultant mixed and stirred system to heat treatment by radiation while mixing and stirring.

18. The method according to claim 17, wherein said radiation is a microwave from a magnetron.

* * * * *